(12) United States Patent
Lin et al.

(10) Patent No.: US 10,514,799 B2
(45) Date of Patent: Dec. 24, 2019

(54) DEEP MACHINE LEARNING TO PERFORM TOUCH MOTION PREDICTION

(71) Applicant: Google Inc., Mountain View, CA (US)

(72) Inventors: Pin-chih Lin, New Taipei (TW); Tai-hsu Lin, New Taipei (TW)

(73) Assignee: Google LLC, Mountain View, CA (US)

( * ) Notice: Subject to any disclaimer, the term of this patent is extended or adjusted under 35 U.S.C. 154(b) by 651 days.

(21) Appl. No.: 15/259,917

(22) Filed: Sep. 8, 2016

(65) Prior Publication Data

US 2018/0067605 A1 Mar. 8, 2018

(51) Int. Cl.
| | |
|---|---|
| *G06F 3/041* | (2006.01) |
| *G06N 20/00* | (2019.01) |
| *G06N 3/04* | (2006.01) |
| *G06N 3/08* | (2006.01) |
| *G06F 3/0488* | (2013.01) |
| *G06F 3/0354* | (2013.01) |

(52) U.S. Cl.
CPC ........ *G06F 3/0416* (2013.01); *G06F 3/04883* (2013.01); *G06N 3/0445* (2013.01); *G06N 3/0454* (2013.01); *G06N 3/084* (2013.01); *G06N 20/00* (2019.01); *G06F 3/03545* (2013.01)

(58) Field of Classification Search
CPC .............. G06F 3/0416; G06F 3/04883; G06F 3/03545; G06N 20/00; G06N 3/0445; G06N 3/0454; G06N 3/084
See application file for complete search history.

(56) References Cited

U.S. PATENT DOCUMENTS

| | | | |
|---|---|---|---|
| 4,752,906 | A | 6/1988 | Kleinfeld |
| 4,990,838 | A | 2/1991 | Kawato et al. |
| 5,105,468 | A | 4/1992 | Guyon et al. |
| 5,412,754 | A | 5/1995 | Le Cun et al. |
| 5,742,702 | A | 4/1998 | Oki |
| 5,812,698 | A | 9/1998 | Platt et al. |
| 5,930,781 | A | 7/1999 | Toomarian et al. |
| 6,038,338 | A | 3/2000 | Nguyen |
| 8,194,926 | B1 | 6/2012 | Keysers et al. |
| 8,717,303 | B2 | 5/2014 | Ludwig |
| 9,224,090 | B2 | 12/2015 | Piekniewski et al. |
| 9,248,834 | B1 | 2/2016 | Ferguson et al. |
| 2012/0056846 | A1 | 3/2012 | Zaliva |

(Continued)

OTHER PUBLICATIONS

Erhan et al., "Scalable Object Detection using Deep Neural Networks", Proceedings of the 2014 IEEE Conference on Computer Vision and Pattern Recognition, Columbus, Ohio. Jun. 23-28, 2014, pp. 2155-2162.

(Continued)

*Primary Examiner* — Austin Hicks
(74) *Attorney, Agent, or Firm* — Dority & Manning, P.A.

(57) ABSTRACT

The present disclosure provides systems and methods that leverage machine learning to perform user input motion prediction. In particular, the systems and methods of the present disclosure can include and use a machine-learned motion prediction model that is trained to receive motion data indicative of motion of a user input object and, in response to receipt of the motion data, output predicted future locations of the user input object. The user input object can be a finger of a user or a stylus operated by the user. The motion prediction model can include a deep recurrent neural network.

19 Claims, 7 Drawing Sheets

(56) References Cited

U.S. PATENT DOCUMENTS

| | | | |
|---|---|---|---|
| 2013/0009896 A1 | 1/2013 | Zaliva | |
| 2013/0297539 A1 | 11/2013 | Piekniewski et al. | |
| 2014/0204036 A1 | 7/2014 | Schillings et al. | |
| 2017/0329324 A1* | 11/2017 | Bachrach | G05D 1/0016 |

OTHER PUBLICATIONS

La et al., "GestureScript: Recognizing Gestures and Their Structure using Rendering Scripts and Interactively Trained Parts", Proceedings of the SIGCHI Conference on Human Factors in Computing Systems, Toronto, Ontario, Canada, Apr. 26-May 1, 2014, pp. 1685-1694.

Miluzzo et al., "TapPrints: Your Finger Taps Have Fingerprints", Proceedings of the 10th International Conference on Mobile Systems, Applications and Services, Low Wood Bay, Lake District, United Kingdom, Jun. 25-29, 2012, pp. 323-336.

Szegedy et al., "Scalable High Quality Object Detection", arXiv:1412.1441v3 [cs.CV] Dec. 9, 2015, 10 pages.

International Search Report for PCT/US2017/047300 dated Nov. 16, 2017, 14 pages.

Graves, "Generating Sequences With Recurrent Neural Networks", arXiv:1308.0850v1, Aug. 4, 2013, 43 pages.

Fragkiadaki et al., "Recurrent Network Models for Human Dynamics", International Conference on Computer Vision, Dec. 13-16, 2015, Santiago, Chile, 9 pages.

Graves, "Generating Sequences with Recurrent Neural Networks", Jun. 5, 2014, http://arxiv.org/pdf/1308.0850.pdf, retrieved on Sep. 9, 2016, 43 pages.

Li et al., "Feesback-Basde Handwriting Recognision from Inertial Sensor Data for Wearable Devices", 40th International Conference on Acoustics, Speech and Signal Processing, Apr. 19-24, 2015, Brisbane, Australia, pp. 2269-2273.

Mitra, "Gesture Recognition: A Survey", IEEE Transactions on Systems, Man, and Cybernetics—Part C: Applications and Reviews, vol. 37, No. 3, May 2007, pp. 311-324.

Ogata et al., "Extracting Multimodal Dynamics of Objects Using RNNPB", International Conference on Intelligent Robots and System, Aug. 2-6, 2005, Alberta, Canada, 8 pages.

* cited by examiner

DEEP MACHINE LEARNING TO PERFORM TOUCH MOTION PREDICTION

FIELD

The present disclosure relates generally to machine learning. More particularly, the present disclosure relates to deep machine learning to perform user input motion prediction.

BACKGROUND

A user can provide user input to a computing device using a user input object, such as, for example, one or more fingers, a stylus operated by the user, or other user input objects. In particular, in one example, a user can use a user input object to touch a touch-sensitive display screen or other touch-sensitive component. The interaction of the user input object with the touch-sensitive display screen enables the user to provide user input to the computing device.

However, in certain existing computing devices, a touch event detected by a touch-sensitive display screen must go through a significantly large processing stack before the result of the touch event is displayed on the screen. For example, a touch input processing stack can include a combination of firmware, kernel, rendering, and vertical synchronization (V-Sync) for a liquid crystal display (LCD) screen. The processing stack may also include the software processing done by respective programs which consume the touch input.

The size and complexity of the processing stack introduces the issue of "touch latency," in which a delay occurs between when the touch event occurs and when the device appears to respond to the touch event. Touch latency is a significant challenge that impacts device performance and user satisfaction. In particular, touch latency is a performance parameter that is highly visible to users and significantly impacts the user experience, typically in a negative way.

While some touch latency could be reduced with better software scheduling, there is a minimum amount of time for a touch event to be processed and then arrive at the screen no matter how well the processing stack has been organized.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to predict motion of user input objects. The method includes obtaining, by one or more computing devices, a first set of motion data associated with a user input object. The first set of motion data is descriptive of a location of the user input object over time. The method includes inputting, by the one or more computing devices, the first set of motion data into a recurrent neural network of a machine-learned motion prediction model. The method includes receiving, by the one or more computing devices as an output of the motion prediction model, a motion prediction vector that describes one or more predicted future locations of the user input object respectively for one or more future times.

Another example aspect of the present disclosure is directed to a computing device that predicts motion of user input objects. The computing device includes at least one processor. The computing device includes a machine-learned motion prediction model that includes a recurrent neural network. The motion prediction model is trained to receive motion data indicative of motion of a user input object and, in response to receipt of the motion data, output predicted future locations of the user input object. The computing device includes at least one tangible, non-transitory computer-readable medium that stores instructions that, when executed by the at least one processor, cause the at least one processor to obtain a first set of motion data associated with the user input object. The first set of motion data is descriptive of a location of the user input object over time. Execution of the instructions causes the at least one processors to input the first set of motion data into the recurrent neural network of the motion prediction model. Execution of the instructions causes the at least one processors to receive, as an output of the motion prediction model, a motion prediction vector that describes the one or more predicted future locations of the user input object respectively for one or more future times. Execution of the instructions causes the at least one processors to perform one or more actions associated with the one or more predicted future locations described by the motion prediction vector.

Another example aspect of the present disclosure is directed to a computing system that includes a user computing device. The user computing device includes at least one processor and at least one non-transitory computer-readable medium. The at least one non-transitory computer-readable medium stores a machine-learned motion prediction model configured to receive motion data indicative of motion of a user input object and, in response to receipt of the motion data, output predicted future locations of the user input object. The motion prediction model was trained by backpropagation of a loss function through the motion prediction model. The loss function includes an error ratio that describes a first sum of one or more lengths respectively of one or more error vectors divided by a second sum of one or more lengths respectively of one or more ground truth vectors. The at least one non-transitory computer-readable medium stores instructions that, when executed by the at least one processor, cause the user computing device to use the machine-learned motion prediction model to obtain the predicted future locations of the user input object.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
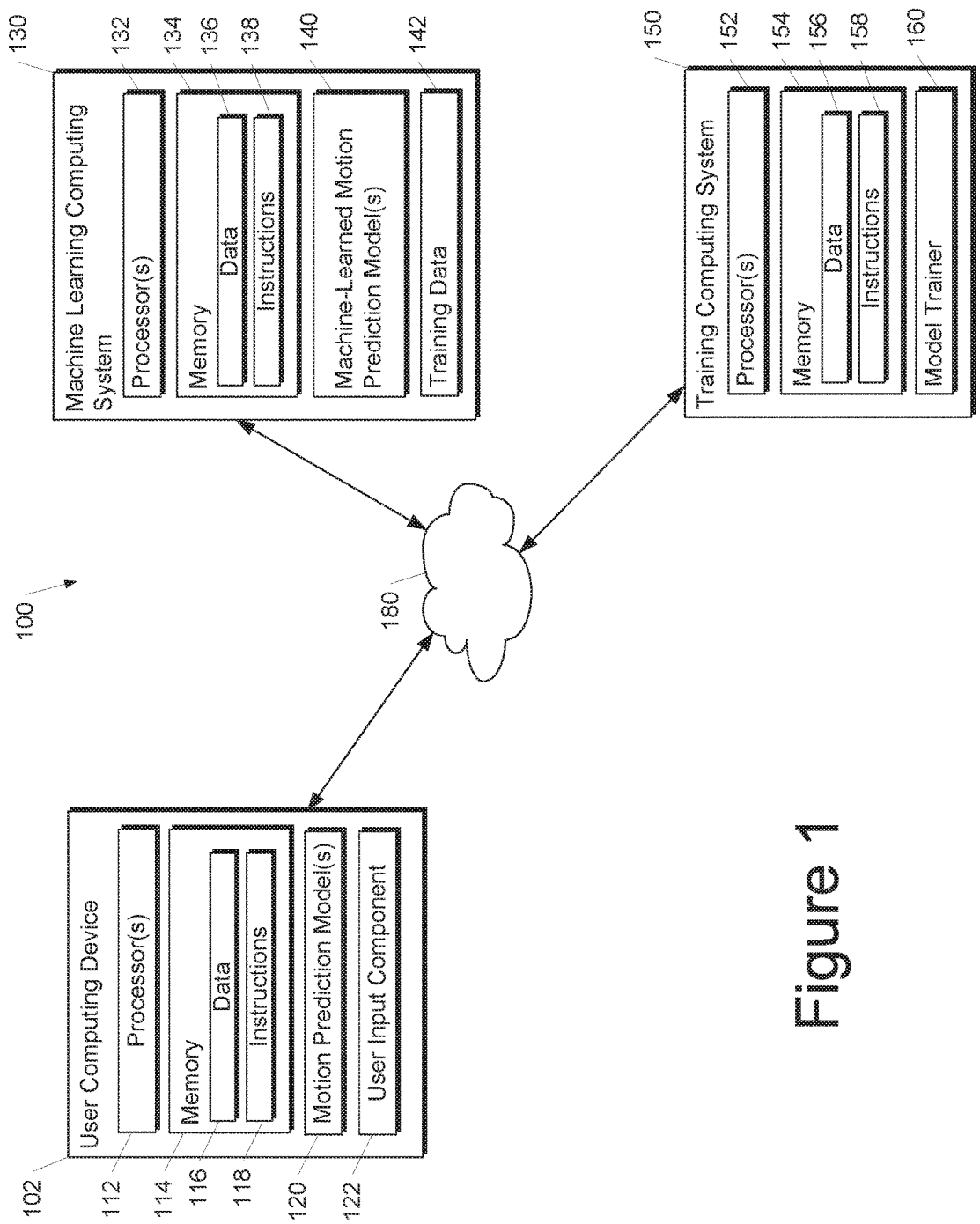
FIG. 1 depicts a block diagram of an example computing system according to example embodiments of the present disclosure.

Generally, the present disclosure is directed to systems and methods that leverage machine learning to perform user input motion prediction. In particular, the systems and methods of the present disclosure can include and use a machine-learned motion prediction model that is trained to receive motion data indicative of motion of a user input object and, in response to receipt of the motion data, output predicted future locations of the user input object. For example, the user input object can be a finger of a user or a stylus operated by the user.

In particular, according to an aspect of the present disclosure, the motion prediction model can include a recurrent neural network (e.g., a deep recurrent neural network). In one example, a user computing device can obtain motion data that describes a location of a user input object over time. The computing device can input the motion data into the recurrent neural network of the motion prediction model and receive a motion prediction vector as an output of the motion prediction model. The motion prediction vector can describe one or more predicted future locations of the user input object respectively for one or more future times.

The computing device can use the motion prediction vector output by the motion prediction model to reduce or even eliminate touch latency. In particular, the computing device can perform operations responsive to or otherwise based on the predicted future locations of the user input object, thereby eliminating the need to wait to receive the remainder of the user input action and process the remainder of the input action through a large processing stack.

To provide an example, a computing device of the present disclosure can input motion data that describes finger motion/locations associated with initial portion of a user touch action (e.g., an initial portion of a swipe left action) into a recurrent neural network of a motion prediction model. In response to receipt of the motion data, the motion prediction model can predict the finger motion/locations associated with the remainder of the user touch action (e.g., the remainder of a swipe left action). The computing device can perform actions in response to the predicted finger motion/locations (e.g., rendering a display screen in which the displayed object has been swiped left). As such, the computing device is not required to wait for and then process the remainder of the user touch action. Therefore, the computing device is able to respond to touch events more quickly and reduce touch latency. For example, high quality motion predictions can enable touch latency to be reduced to levels that are not perceivable by human users.

More particularly, aspects of the present disclosure are applicable to computing devices that receive user input via motion of a user input object. Example user input objects include one or more fingers of a user, a stylus operated by the user, or other user input objects. In particular, in one example, the user can employ a user input object to touch a touch-sensitive display screen or other touch-sensitive component of the computing device. Motion of the user input object relative to the touch-sensitive display screen enables the user to provide user input to the computing device.

In particular, the computing device can generate or otherwise obtain a set of motion data that describes a location of the user input object over time. For example, data received from various sensors (e.g., the touch-sensitive display screen or other user input components) can be collected and processed to generate the set of motion data. As one example, the set of motion data can include one or more entries of object location and time. For example, the set of motion data can include one or more entries that provide the location of the user input object in both the x and y dimensions and also a timestamp associated with each location.

As another example, the set of motion data can include one or more entries that describe a change in the location of the user input object in both the x and y dimensions and also a timestamp or change in time associated with each pair of change in x and change in y values. In some implementations, the set of motion data is iteratively updated, refreshed, or generated as additional motion of the user input object is detected. As described above, the set of motion data can be input into a motion prediction model to obtain predictions about the future location of the user input object at one or more future times.

In yet further implementations, the computing device can collect additional data that is descriptive of the user input object and can input such data into the motion prediction model alongside the set of motion data. For example, information (e.g., sensor data) about user input object pressure on the touch-sensitive display screen, user input object radius on the touch-sensitive display screen, or other user input object parameters can be collected and provided to the motion prediction model for use in predicting the future location of the user input object.

According to another aspect of the present disclosure, in some implementations, the motion prediction model includes two phases. In a first phase, a computing device inputs the set of motion data into a recurrent neural network (e.g., a long short-term memory (LSTM) neural network, a gated recurrent unit (GRU) neural network, or other forms of recurrent neural networks). In response to receipt of the set of motion data, the recurrent neural network outputs a high-dimensional context vector.

In a second phase of the motion prediction model, the high-dimensional context vector is input into a feed forward neural network. In addition, in some implementations, the computing device inputs a time vector into the feed forward neural network alongside the high-dimensional context vector. The time vector can provide a list of time lengths that are desired to be predicted by the motion prediction model (e.g., 10 ms, 20 ms, etc.). Thus, the time vector can describe one or more future times at which the location of the user input object is to be predicted. In response to receipt of the high-dimensional context vector and time vector, the feed forward network can output a motion prediction vector that describes a predicted future location of the user input object for each time or time length described by the time vector. For example, the motion prediction vector can include a pair of values for location in the x and the y dimensions for each future time or a pair of values for change in the x and the y dimensions for each future time.

Use of a two phase motion prediction model as described above can provide a number of benefits. As one example, use of a two phase motion prediction model eliminates problems associated with a discrepancy between indications of time (e.g., timestamps) included in training data versus indications of time observed by the model during actual field use.

In some implementations, the feed forward network of the second phase can be replaced with a recurrent decoder neural network. In other implementations, the two phase hybrid motion prediction model described above can be replaced with a single stacked recurrent neural network (e.g., LSTM neural network). In particular, in such implementations, both the time vector and the set of motion data can be input into the recurrent neural network. In response to receipt of the time vector and the set of motion data, the recurrent neural network can output the motion prediction vector.

In some implementations, the computing device can feed the motion data for the user input object into the recurrent neural network in an online manner. For example, during use in the field, the latest motion data update (e.g., values for changes in x, y, and time) can be fed into the recurrent neural network upon each instance in which a user input object motion update is received from the relevant sensor(s) (e.g., touch-sensitive display screen). Thus, motion data collection and motion prediction can be performed iteratively as additional motion data is collected for the user input object. As such, one benefit provided by the use of recurrent neural networks is the ability to maintain context from previous updates as new motion updates are input in the online manner described above.

According to another aspect of the present disclosure, the motion prediction models described herein can be trained on ground-truth motion data using a novel loss function. More particularly, a training computing system can train the motion prediction models using a training dataset that includes a number of sets of ground-truth motion data for user input objects. For example, the training dataset can include motion data that describes a large number of previously-observed motion trajectories of user input objects.

In some implementations, to train the motion prediction model, a first portion of a set of ground-truth motion data is input into the motion prediction model to be trained. In response to receipt of such first portion, the motion prediction model outputs a motion prediction vector that predicts the remainder of the set of ground-truth motion data.

After such prediction, the training computing system can apply or otherwise determine a loss function that compares the motion prediction vector output by the motion prediction model to the remainder of the ground-truth motion data which the motion prediction model attempted to predict. The training computing system can backpropagate (e.g., by performing truncated backpropagation through time) the loss function through the motion prediction model.

In particular, according to an aspect of the present disclosure, in some implementations, the loss function can take the form of or otherwise include a novel error ratio. The error ratio can be defined as a sum of the lengths of one or more error vectors divided by a sum of the lengths of one or more ground-truth vectors that were attempted to be predicted. In other implementations, the squares of the sums can be used instead of the sums themselves. In some implementations, the training computing system can determine the loss function for a whole mini-batch of training data at once.

Use of an error ratio that relies upon the "ratio-of-averages" or "average of summations" as described herein prevents division by zero errors that would occur if each error vector/ground-truth vector combination was considered separately, as there will be some instances in which the ground-truth vector is null or zero (e.g., zero motion of the user input object).

Using the error ratio as described herein also improves the scale invariance of the motion prediction model. For example, some or all of the training data and/or field use data can be formatted to describe motion or location in units of pixels, which are typically resolution-dependent. Therefore, use of the error ratio enables unit-agnostic training. However, in other implementations, the loss function can include other error measures in addition or alternatively to the error ratio described herein. For example, alternative error measures include the root-mean-square error, L1-loss, L2-loss, or other measures.

According to another aspect of the present disclosure, in some implementations, the computing device can implement separate instances of motion prediction models for each of two or more user input objects that are simultaneously providing input to the device. As one example, if a user employs two fingers to interact with the touch-sensitive screen, separate motion data for each of the two fingers can be respectively input into two separate, parallel motion prediction models. For example, each model can provide one prediction for each incoming location update for its corresponding user input object (e.g., finger).

In addition, in some implementations, each motion prediction model can be maintained so long as location updates are received for its corresponding user input object. Stated differently, a recurrent neural network can be maintained for each user input object for the lifetime of such user input object. For example, the "lifetime" of a particular finger can span the duration of time for which the finger is in contact with the touch-sensitive screen. After the lifetime of the user input object, the computing device can clear a cache associated with the recurrent neural network of the motion prediction model for the user input object. In such fashion, a recurrent neural network can use its internal memory to better predict motion of a user input object over the lifetime of the user input object.

According to another aspect of the present disclosure, an application, program, or other component of the computing device (e.g., a handwriting recognition application) can consume or otherwise be provided with the motion prediction vector. The application can treat the predicted future locations of the user input object as if the user input object had already been moved to such predicted locations. For example, the handwriting recognition application can recognize handwriting on the basis of the predicted future locations provided by the motion prediction vector. Therefore, the application does not need to wait for the remainder of the user input action to be received and processed through a large processing stack, thereby reducing latency.

Thus, the present disclosure provides technical, machine learning based solutions to the technical problem of touch latency. One example benefit of the present disclosure is improved prediction quality. In particular, the neural networks described herein are excellent function approximators and offer far richer prediction capability as compared to polynomials. As such, the motion prediction models of the present disclosure can provide superior prediction accuracy if trained properly.

In addition to reduced touch latency, the present disclosure can result in a number of additional technical benefits, including, for example, smoother finger tracking, improved handwriting recognition, faster and more precise user control of user-manipulable virtual objects (e.g., objects within a game), and many other benefits in scenarios in which user motion input is provided to the computing device.

Another example technical benefit of the present disclosure is its relatively low memory usage/requirement. In particular, the neural networks described herein effectively summarize the training data and compress it into compact form (e.g., the neural network itself). This greatly reduces the amount of memory needed to store and implement the prediction algorithm.

Another example technical benefit of the present disclosure is improved scalability. In particular, modeling the motion data through neural networks greatly reduces the research time needed relative to development of a hand-crafted motion prediction algorithm. For example, for hand-crafted motion prediction algorithms, the designer would need to iterate the algorithm on data and design unique approaches to handle different scenarios. By contrast, to use neural networks as described herein, the network can be trained on appropriate training data, which can be done at a massive scale if the training system permits. In addition, the neural networks can easily be revised as new training data is made available.

With reference now to the Figures, example embodiments of the present disclosure will be discussed in further detail.

Example Devices and Systems

FIG. 1 depicts an example computing system 100 to predict motion of user input objects according to example embodiments of the present disclosure. The system 100 includes a user computing device 102, a machine learning computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more motion prediction models 120. For example, the one or more motion prediction models 120 can be received from the machine learning computing system 130 over network 180, stored in the user computing device memory 114, and the used or otherwise implemented by the one or more processors 112. In some implementations, the user computing device 102 can implement multiple parallel instances of a single motion prediction model 120 (e.g., to perform parallel motion prediction for multiple user input objects).

The user computing device 102 can also include a user input component 122 that receives user input by way of motion of a user input object. For example, the user input component 122 can be a touch-sensitive component (e.g., a touch-sensitive display screen or a touch pad) that is sensitive to the touch of a user input object (e.g., a finger or a stylus). However, the user input component 122 can include other components that are able to receive user input by way of motion of a user input object. For example, the user input component 122 can track the motion of a user input object through computer vision systems that analyze imagery collected by a camera of the device 102 or through the use of radar (e.g., miniature radar) to detect touchless gesture-based user input. Thus, motion of a user input object relative to the user input component 122 enables the user to provide user input to the computing device 102.

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the machine learning computing system 130 to perform operations.

In some implementations, the machine learning computing system 130 includes or is otherwise implemented by one or more server computing devices. In instances in which the machine learning computing system 130 includes plural server computing devices, such server computing devices can operate according to sequential computing architectures, parallel computing architectures, or some combination thereof.

The machine learning computing system 130 stores or otherwise includes one or more machine-learned motion prediction models 140. For example, the motion prediction models 140 can be or can otherwise include various machine-learned models such as neural networks (e.g., deep recurrent neural networks) or other multi-layer non-linear models. Example motion prediction models 140 are discussed with reference to FIGS. 2-4.

The machine learning computing system 130 can train the motion prediction models 140 via interaction with the training computing system 150 that is communicatively coupled over the network 180. The training computing system 150 can be separate from the machine learning computing system 130 or can be a portion of the machine learning computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the machine learning computing system 130 using various training or learning techniques, such as, for example, backwards propagation (e.g., truncated backpropagation through time). The model trainer 160 can perform a number of generalization techniques (e.g., weight decays, dropouts, etc.) to improve the generalization capability of the models being trained.

In particular, the model trainer 160 can train a motion prediction model 140 based on a set of training data 142. The training data 142 can include ground-truth motion data (e.g., ground-truth vectors that describe recorded user input object paths, trajectories, locations, or other motion data). In some implementations, the training examples can be provided by the user computing device 102 (e.g., based on user input actions performed by the user of the user computing device 102). Thus, in such implementations, the model 120 provided to the user computing device 102 can be trained by the training computing system 150 on user-specific motion data received from the user computing device 102.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device can include the model trainer and the training dataset. In such implementations, the motion prediction models can be both trained and used locally at the user computing device.

Example Motion Prediction Models

Figure 2:
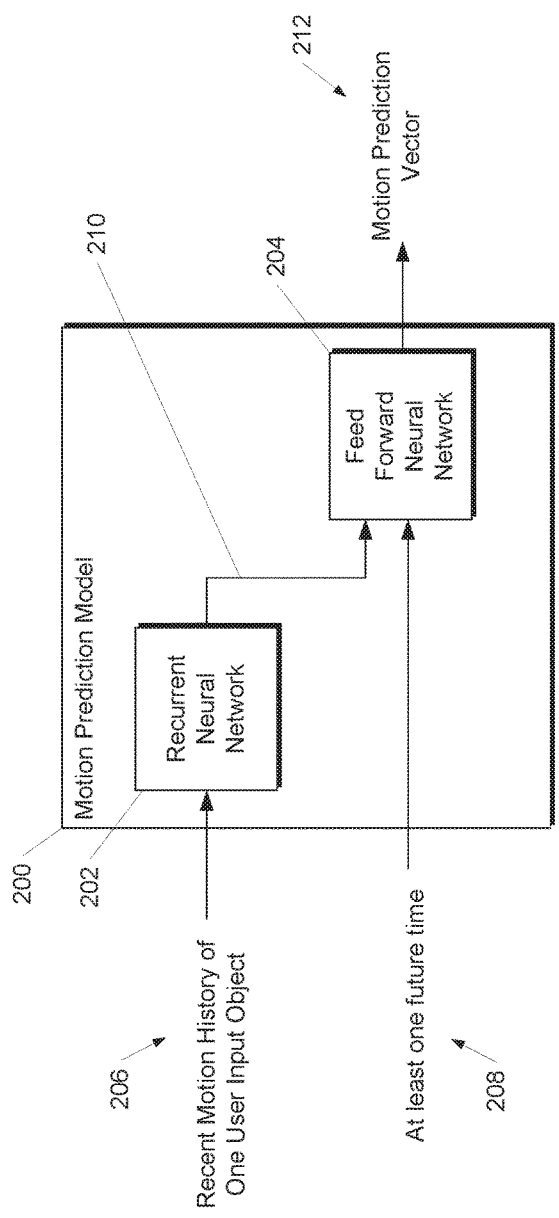
FIG. 2 depicts a block diagram of an example motion prediction model according to example embodiments of the present disclosure.

FIG. 2 depicts an example motion prediction model 200 according to example embodiments of the present disclosure. The motion prediction model 200 includes a recurrent neural network 202. For example, the recurrent neural network 202 can be a deep recurrent neural network. For example, the recurrent neural network 202 can be a multi-layer LSTM neural network or a multi-layer GRU neural network.

The recurrent neural network 202 can receive a recent motion history 206 of a user input object as an input. For example, the recent motion history 206 can take the form of a location update. The recent motion history 206 can describe the location of the user input object over time.

As one example, the motion history 206 can include one or more entries of object location and time. For example, the set of motion data can include one or more entries that provide the location of the user input object in both the x and y dimensions and also a timestamp associated with each location.

As another example, the motion history 206 can include one or more entries that describe a change in the location of the user input object in both the x and y dimensions and also a timestamp or change in time associated with each pair of change in x and change in y values.

In some implementations, the motion history 206 is input into the recurrent neural network 202 in an online manner. For example, during use in the field, the latest motion data update 206 (e.g., values for changes in x, y, and time) can be fed into the recurrent neural network 202 upon each instance in which a user input object motion update 206 is received from the relevant sensor(s) (e.g., touch-sensitive display screen). As such, one benefit provided by the recurrent neural network 202 is the ability to maintain context from previous updates 206 as new motion updates 206 are input in the online manner described above.

In yet further implementations, additional data that is descriptive of the user input object can be input into the recurrent neural network 202 alongside the motion history 206. For example, information (e.g., sensor data) about user input object pressure on the touch-sensitive display screen, user input object radius on the touch-sensitive display screen, or other user input object parameters can be collected and provided to the recurrent neural network 202.

In response to receipt of the motion history 206, the recurrent neural network 202 can output a high-dimensional context vector 210. For example, the high-dimensional context vector 210 can have features for over one-hundred dimensions.

The motion prediction model 200 also includes a feed forward neural network 204. The feed forward neural network 204 receives the high-dimensional context vector 210. In addition, the feed forward neural network 204 receives information that describes at least one future time 208. For example, the information 208 can be a time vector that provides a list of time lengths that are desired to be predicted by the motion prediction model 200 (e.g., 10 ms, 20 ms, 30 ms, etc.).

In response to receipt of the high-dimensional context vector 210 and the at least one future time 208, the feed forward neural network 204 outputs a motion prediction vector 212. The motion prediction vector 212 can describe a predicted future location of the user input object for each of the at least one future times 208.

Figure 3:
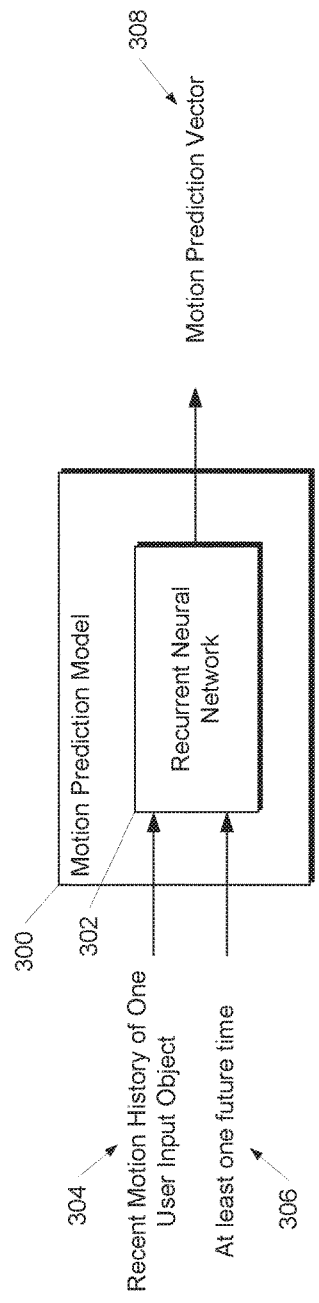
FIG. 3 depicts a block diagram of an example motion prediction model according to example embodiments of the present disclosure.

As another example, FIG. 3 depicts another example motion prediction model 300 according to example embodiments of the present disclosure. The motion prediction model 300 includes a recurrent neural network 302. The recurrent neural network 302 can be similar to the recurrent neural network 202 of FIG. 2.

However, in the model 300 of FIG. 3, the recurrent neural network 302 includes both a recent motion history of one user input object 304 and also information descriptive of at least one future time 306. In response to receipt of the motion history 304 and the at least one future time 306, the recurrent neural network 302 outputs a motion prediction vector 308. The motion prediction vector 308 can describe a predicted future location of the user input object for each of the at least one future times 306.

Figure 4:
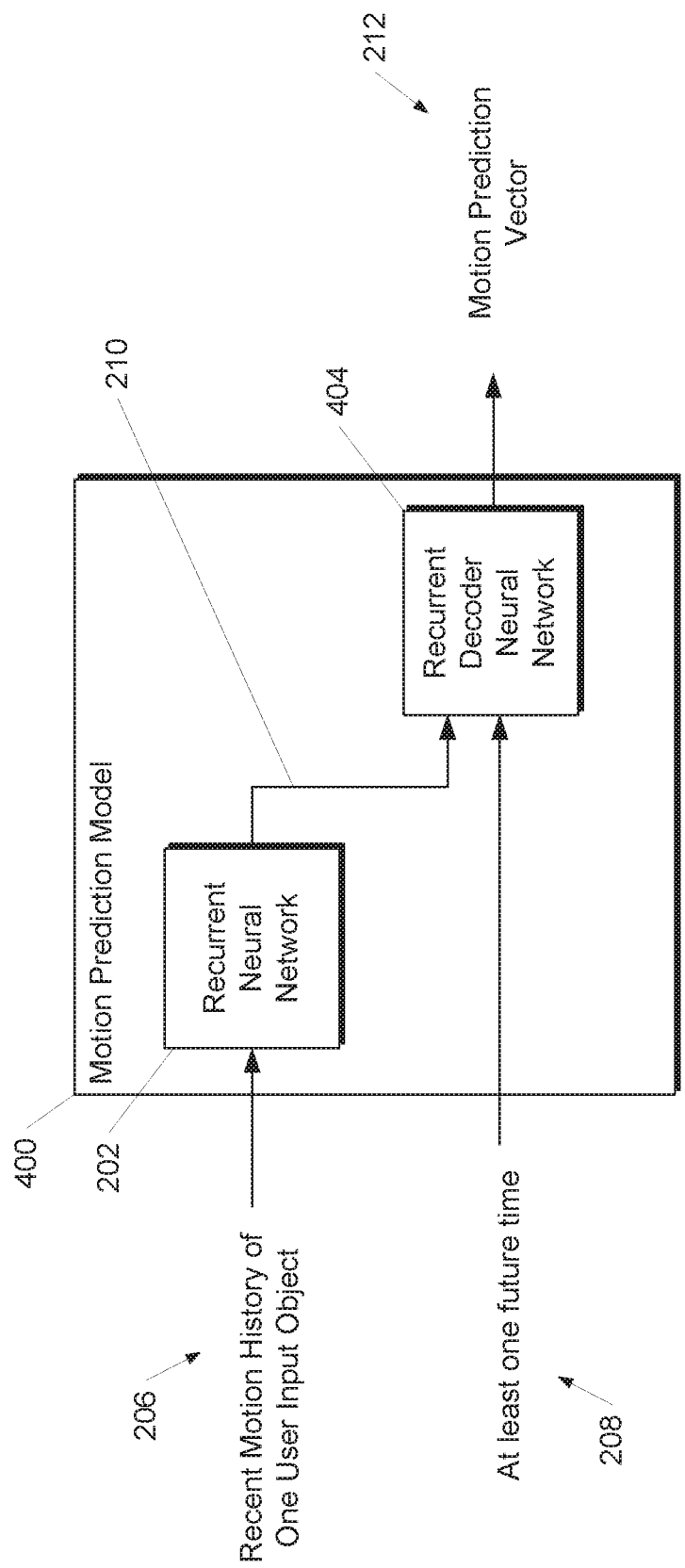
FIG. 4 depicts a block diagram of an example motion prediction model according to example embodiments of the present disclosure.

As yet another example, FIG. 4 depicts another example motion prediction model 400 according to example embodiments of the present disclosure. The model 400 is highly similar to the model 200 of FIG. 2, as indicated by identical reference numerals for various components and data illustrated by both FIG. 2 and FIG. 4. However, the model 400 includes a recurrent decoder neural network 404 in place of the feed forward network 204 of model 200 of FIG. 2.

Example Methods

Figure 5:
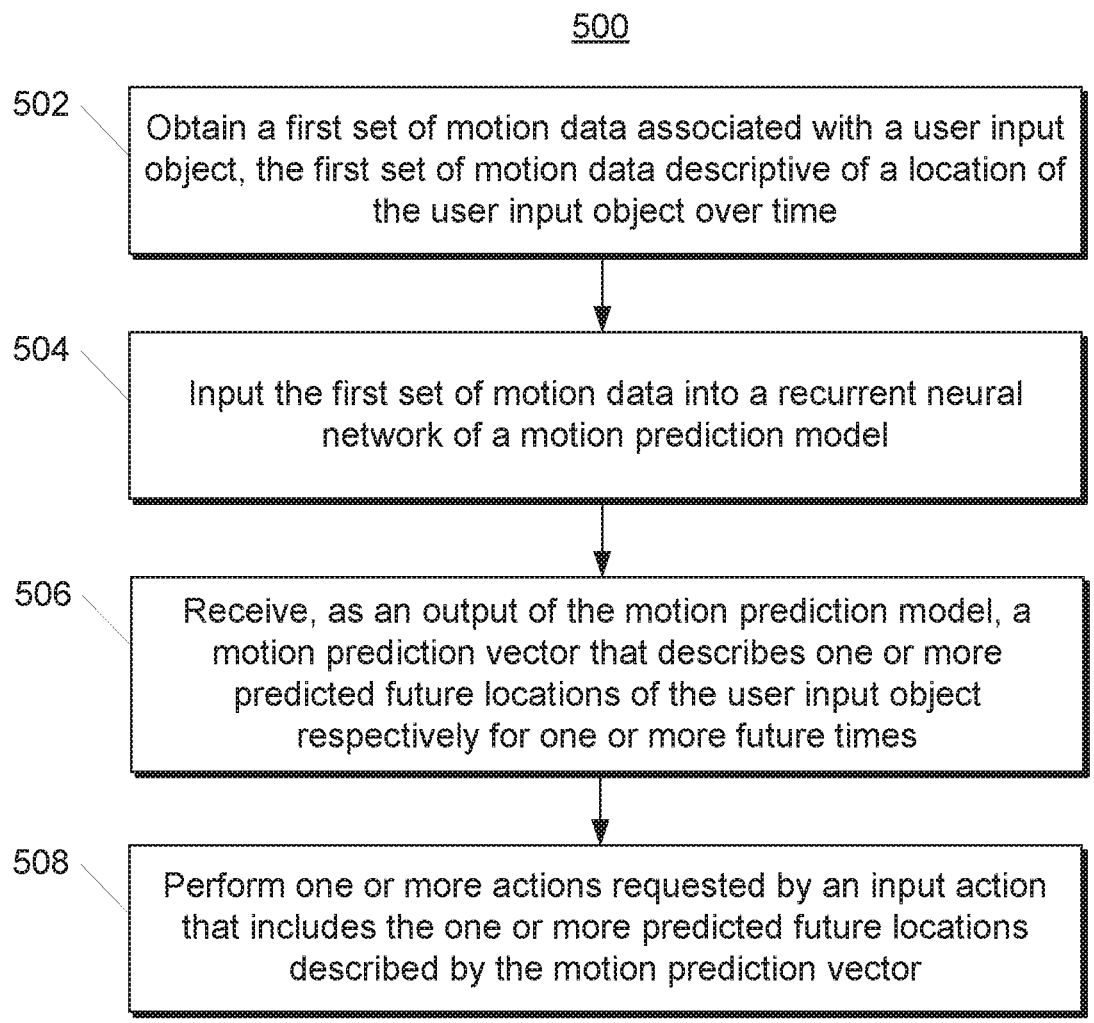
FIG. 5 depicts a flow chart diagram of an example method to predict motion of user input objects according to example embodiments of the present disclosure.

FIG. 5 depicts a flow chart diagram of an example method 500 to predict motion of user input objects according to example embodiments of the present disclosure.

At 502, a computing device obtains a first set of motion data associated with a user input object. The first set of motion data can be descriptive of a location of the user input object over time. For example, data received from various sensors (e.g., a touch-sensitive display screen or other user input components) can be collected and processed to generate the set of motion data. As one example, the set of motion data can include one or more entries of object location and time. For example, the set of motion data can include one or more entries that provide the location of the user input object in both the x and y dimensions and also a timestamp associated with each location.

As another example, the set of motion data can include one or more entries that describe a change in the location of the user input object in both the x and y dimensions and also a timestamp or change in time associated with each pair of change in x and change in y values. In some implementations, the set of motion data is iteratively updated, refreshed, or generated as additional motion of the user input object is detected. Thus, for example, method 500 can be performed in an iterative manner as location updates are received.

At 504, the computing device inputs the first set of motion data into a recurrent neural network of a motion prediction model. In some implementations, the computing device can collect additional data that is descriptive of the user input object and can input such data into the motion prediction model alongside the set of motion data at 504. For example, information (e.g., sensor data) about user input object pressure on the touch-sensitive display screen, user input object radius on the touch-sensitive display screen, or other user input object parameters can be collected and provided to the motion prediction model for use in predicting the future location of the user input object.

In some implementations, the motion prediction model includes two phases. In a first phase, the computing device inputs the set of motion data into a recurrent neural network (e.g., a long short-term memory (LSTM) neural network, a gated recurrent unit (GRU) neural network, or other forms of recurrent neural networks). In response to receipt of the set of motion data, the recurrent neural network outputs a high-dimensional context vector.

In a second phase of the motion prediction model, the high-dimensional context vector is input into a feed forward neural network. In addition, in some implementations, the computing device inputs a time vector into the feed forward neural network alongside the high-dimensional context vector. The time vector can provide a list of time lengths that are desired to be predicted by the motion prediction model (e.g., 10 ms, 20 ms, etc.). Thus, the time vector can describe one or more future times at which the location of the user input object is to be predicted.

In response to receipt of the high-dimensional context vector and time vector, the feed forward network can output a motion prediction vector that describes a predicted future location of the user input object for each time or time length described by the time vector. In particular, referring again to FIG. 5, at 506, the computing device receives, as an output of the motion prediction model, the motion prediction vector that describes one or more predicted future locations of the user input object respectively for one or more future times.

In some implementations, the feed forward network of the second phase can be replaced with a recurrent decoder neural network. In other implementations, the two phase hybrid motion prediction model described above can be replaced with a single stacked recurrent neural network (e.g., LSTM neural network). In particular, in such implementations, both the time vector and the set of motion data can be input into the recurrent neural network at 504. In response to receipt of the time vector and the set of motion data, the recurrent neural network can output the motion prediction vector at 506.

In some implementations, the computing device can feed the motion data for the user input object into the recurrent neural network at 504 in an online manner. For example, during use in the field, the latest motion data update (e.g., values for changes in x, y, and time) can be fed into the recurrent neural network at 504 upon each instance in which a user input object motion update is received at 502 from the relevant sensor(s) (e.g., touch-sensitive display screen). Thus, motion data collection at 502 and motion prediction at 504-506 can be performed iteratively as additional motion data is collected for the user input object. As such, one benefit provided by the use of recurrent neural networks is the ability to maintain context from previous updates as new motion updates are input in the online manner described above.

At 508, the computing device performs one or more actions requested by an input action that includes the one or more predicted future locations described by the motion prediction vector. For example, the predicted future locations of the user input object can be treated as though they were received by the user input component (e.g., touch-sensitive display screen). Thus, the predicted location of the user input object can be used to complete a user input action (e.g., a swipe left action), the initial portion of which was described by the set of motion data obtained at 502. Thus, predicted future user input object locations can correspond to a requested action (e.g., computing actions requested by the swipe left) and the requested action(s) can be performed at 508 (e.g., render the display screen so that an item previously displayed on the screen has been swiped left).

Figure 6:
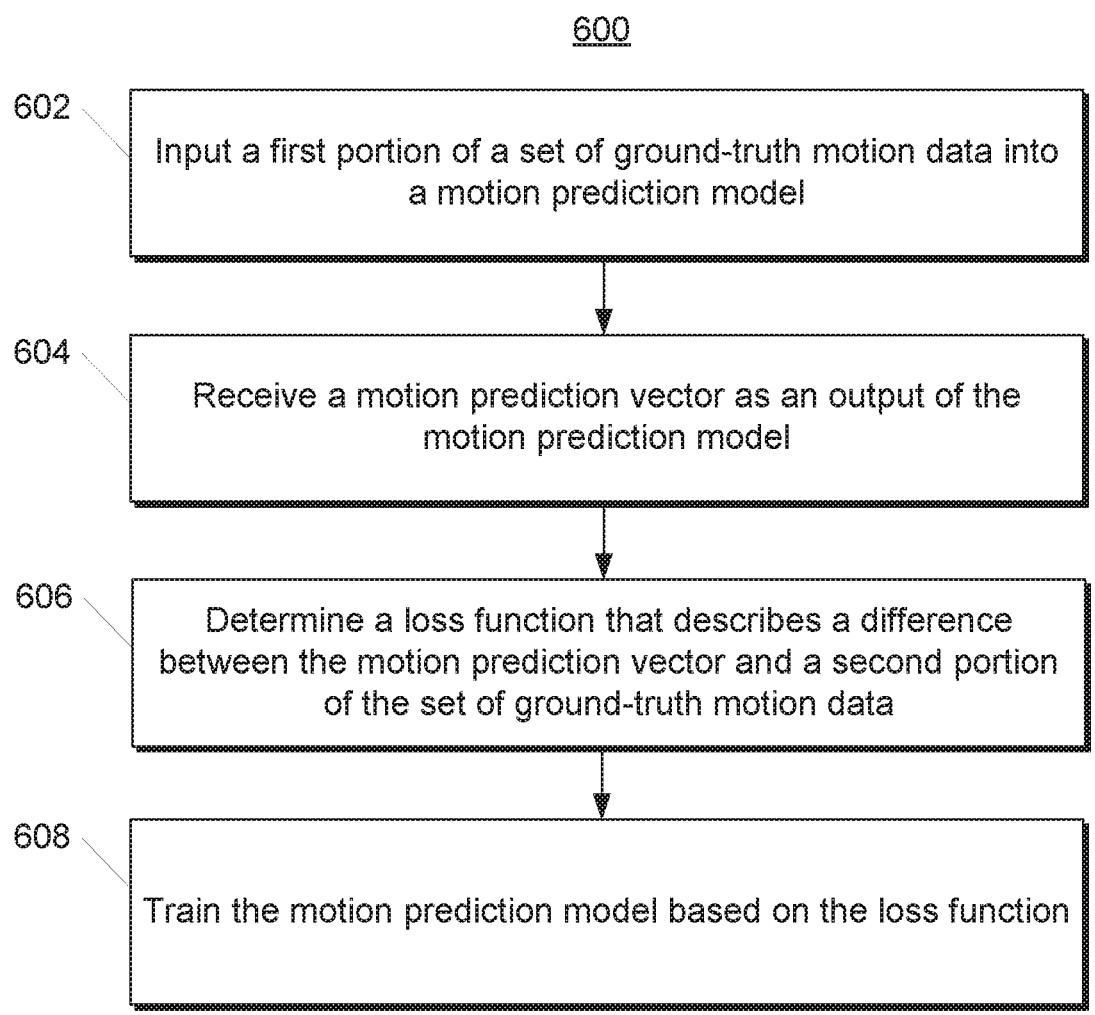
FIG. 6 depicts a flow chart diagram of an example method to train a motion prediction model according to example embodiments of the present disclosure.

FIG. 6 depicts a flow chart diagram of an example method 600 to train a motion prediction model according to example embodiments of the present disclosure. In particular, according to another aspect of the present disclosure, the motion prediction models described herein can be trained on ground-truth motion data using a novel loss function. A training computing system can train the motion prediction models using a training dataset that includes a number of sets of ground-truth motion data for user input objects. For example, the training dataset can include motion data that describes a large number of previously-observed motion trajectories of user input objects.

Figure 7:
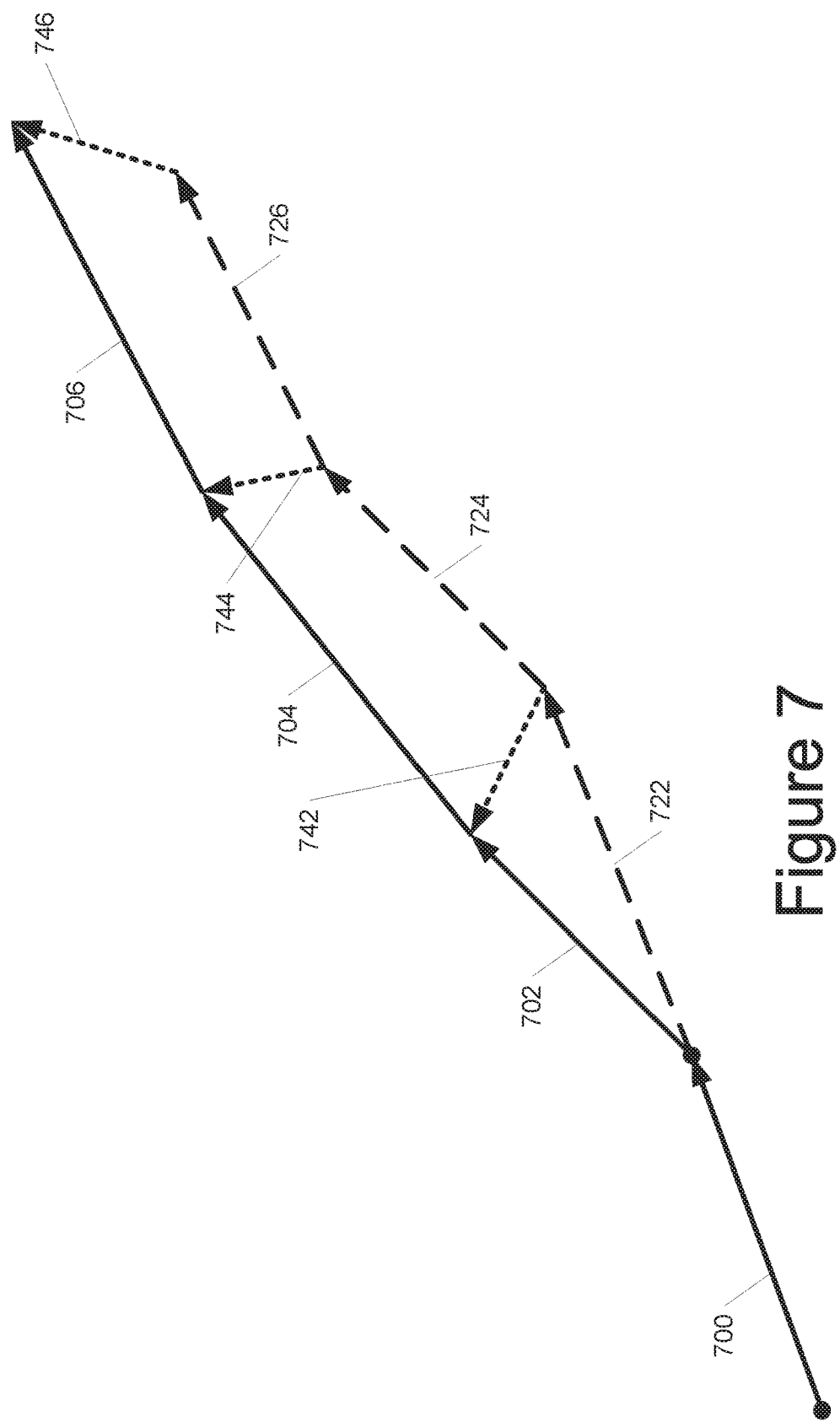
FIG. 7 depicts a graphical diagram of example motion vectors according to example embodiments of the present disclosure.

As an example, FIG. 7 depicts a graphical diagram of example motion vectors according to example embodiments of the present disclosure. In particular, FIG. 7 illustrates a set of ground-truth motion data that includes four ground-truth motion vectors: 700, 702, 704, and 706. These ground-truth motion vectors 700, 702, 704, and 706 can form a set of ground-truth motion data usable for training the model. The ground-truth motion vectors 700, 702, 704, and 706 can describe a previously observed user input object trajectory/trace. FIG. 7 is provided as one simplified example for the purpose of explanation and the present disclosure is not limited to the example shown in FIG. 7.

Referring again to FIG. 6, at 602, a computing device inputs a first portion of a set of ground-truth motion data into a motion prediction model. For example, at 602, the computing device can input the first ground-truth motion vector 700 into the motion prediction model. The input of the first ground-truth motion vector 700 is provided as an example only. In other instances, more than one ground-truth motion vector can be input at 602.

In response to receipt of such first portion, the motion prediction model outputs a motion prediction vector that predicts the remainder of the set of ground-truth motion data. Thus, at 604, the computing device receives a motion prediction vector as an output of the motion prediction model.

As an example, referring again to FIG. 7, in response to receipt of the first ground-truth motion vector 700, the motion prediction model can output a motion prediction vector that identifies three predicted future locations for the user input object. This motion prediction vector is graphically represented by predicted vectors 722, 724, and 726, collectively. For example, the first predicted vector 722 extends from the last known location of the user input object to the first predicted future location of the user input object; the second predicted vector 724 extends from the first predicted future location to the second predicted future location; and the third predicted vector 726 extends from the second predicted future location to the third predicted future location. The inclusion of three predicted future locations in the motion prediction vector is provided as one example only. The motion prediction vector can include any number (e.g., one or greater) of predicted future locations (e.g., as guided by the input time vector).

Referring again to FIG. 6, at 606, the computing device determines a loss function that describes a difference between the motion prediction vector and a second portion of the set of ground-truth motion data. For example, according to an aspect of the present disclosure, in some implementations, the loss function can take the form of or otherwise include a novel error ratio. The error ratio can be defined as a sum of the lengths of one or more error vectors divided by a sum of the lengths of one or more ground-truth vectors that were attempted to be predicted. In other implementations, the squares of the sums can be used instead of the sums themselves. In some implementations, the training computing system can determine the loss function for a whole mini-batch of training data at once.

As an example, referring again to FIG. 7, a set of error vectors 742, 744, and 746 can be respectively defined based on a difference between the predicted vectors 722, 724, 726 and the corresponding ground-truth motion vectors 702, 704, and 706, respectively. To continue the example, the error ratio can be defined as the sum of the lengths of vectors 742, 744, and 746 divided by the sum of the lengths of vectors 702, 704, and 706. In some implementations, this error ratio is determined for an entire batch of training data, not just a single pair of ground-truth data and motion prediction vectors.

Use of an error ratio that relies upon the "ratio-of-averages" or "average of summations" as described herein prevents division by zero errors that would occur if each error vector/ground-truth vector combination was considered separately, as there will be some instances in which the ground-truth vector is null or zero (e.g., zero motion of the user input object).

Using the error ratio as described herein also improves the scale invariance of the motion prediction model. For example, some or all of the training data and/or field use data can be formatted to describe motion or location in units of pixels, which are typically resolution-dependent. Therefore, use of the error ratio enables unit-agnostic training. However, in other implementations, the loss function can include other error measures in addition or alternatively to the error ratio described herein. For example, alternative error measures include the root-mean-square error, L1-loss, L2-loss, or other measures.

Referring again to FIG. 6, at 608, the computing device trains the motion prediction model based on the loss function. For example, the computing device can perform truncated backwards propagation through time to backpropagate the loss function through the motion prediction model. A number of generalization techniques (e.g., weight decays, dropouts, etc.) can optionally be performed at 608 to improve the generalization capability of the models being trained.

After the model has been trained at 608, it can be provided to and stored at a user computing device for use in predicting motion of a user input object at the user computing device. More particularly, the training procedure described in 602-608 can be repeated several times (e.g., until an objective loss function no longer improves) to train the model.

Figure 8:
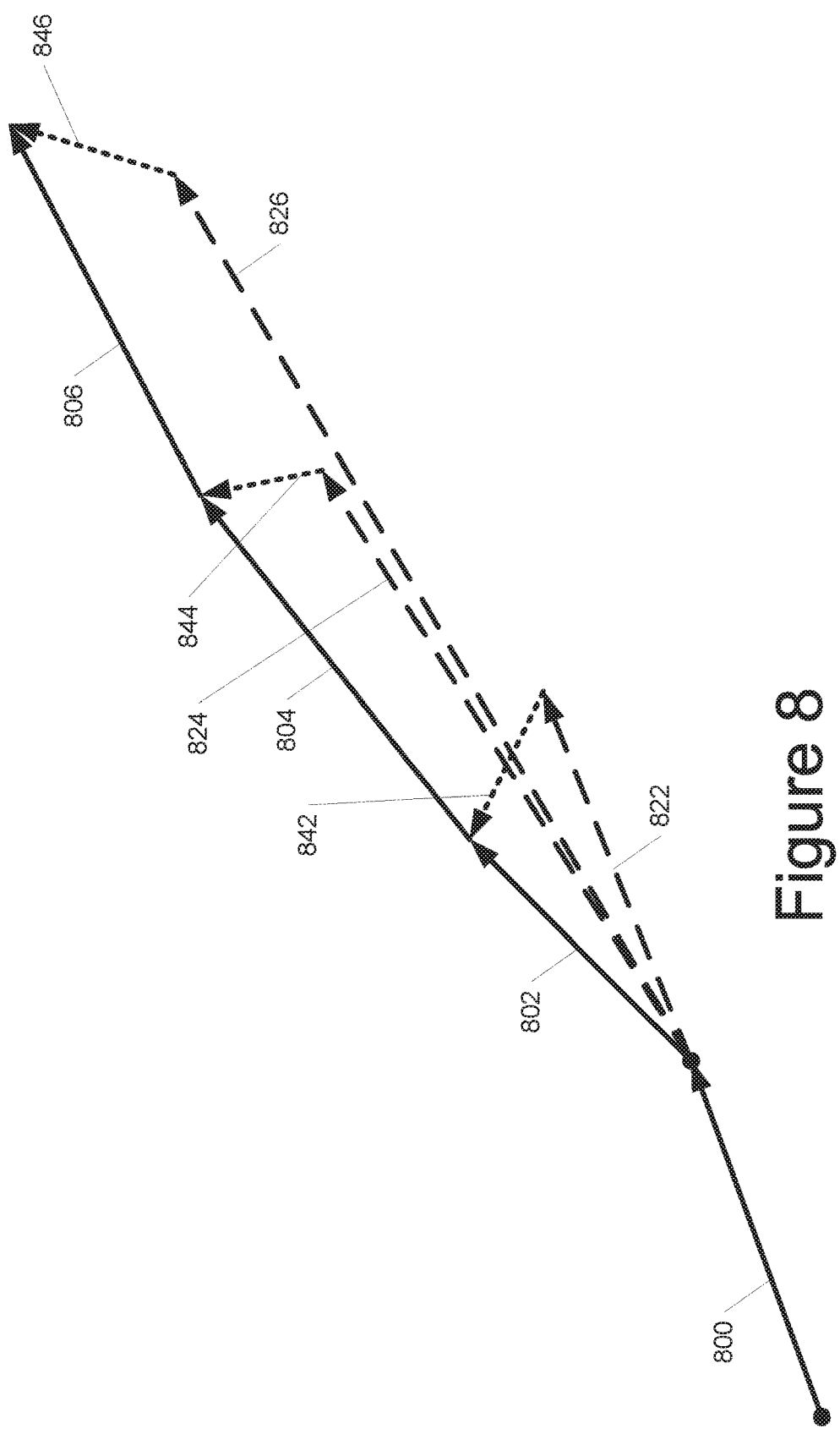
FIG. 8 depicts a graphical diagram of example motion vectors according to example embodiments of the present disclosure.

As another example, FIG. 8 depicts a graphical diagram of example motion vectors according to example embodiments of the present disclosure. In particular, FIG. 8 illustrates a set of ground-truth motion data that includes four ground-truth motion vectors: 800, 802, 804, and 806. These ground-truth motion vectors 800, 802, 804, and 806 can form a set of ground-truth motion data usable for training the model. The ground-truth motion vectors 800, 802, 804, and 806 can describe a previously observed user input object trajectory/trace. FIG. 8 is provided as one simplified example for the purpose of explanation and the present disclosure is not limited to the example shown in FIG. 8.

To continue the example, in response to receipt of the first ground-truth motion vector 800, a motion prediction model can output a motion prediction vector that identifies three predicted future locations for the user input object. This motion prediction vectors is graphically represented by predicted vectors 822, 824, and 826, collectively. For example, the first predicted vector 822 extends from the last known location of the user input object to the first predicted future location of the user input object; the second predicted vector 824 extends from the last known location of the user input object to the second predicted future location; and the third predicted vector 826 extends from the last known location of the user input object to the third predicted future location. The inclusion of three predicted future locations in the motion prediction vector is provided as one example only. The motion prediction vector can include any number (e.g., one or greater) of predicted future locations (e.g., as guided by the input time vector).

In addition, a set of error vectors 842, 844, and 846 can be respectively defined based on a difference between the predicted vectors 822, 824, 826 and the corresponding locations provided by the ground-truth motion vectors 802, 804, and 806, respectively. To continue the example, the error ratio can be defined as the sum of the lengths of vectors 842, 844, and 846 divided by the sum of the length of vector 802, the length of vectors 802+804, and the length of vectors

802+804+806. In some implementations, this error ratio is determined for an entire batch of training data, not just a single pair of ground-truth data and motion prediction vectors.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 5 and 6 respectively depict steps performed in a particular order for purposes of illustration and discussion, the methods of the present disclosure are not limited to the particularly illustrated order or arrangement. The various steps of the methods 500 and 600 can be omitted, rearranged, combined, and/or adapted in various ways without deviating from the scope of the present disclosure.

What is claimed is:

1. A computer-implemented method to predict motion of user input objects, the method comprising:
   obtaining, by one or more computing devices, a first set of motion data associated with a user input object, the first set of motion data descriptive of a location of the user input object over time;
   inputting, by the one or more computing devices, the first set of motion data into a recurrent neural network of a machine-learned motion prediction model;
   receiving, by the one or more computing devices as an output of the motion prediction model, a motion prediction vector that describes one or more predicted future locations of the user input object respectively for one or more future times; and
   clearing, by the one or more computing devices, a cache associated with the recurrent neural network upon a determination that the user input object has ceased providing user input.

2. The computer-implemented method of claim 1, wherein obtaining, by the one or more computing devices, the first set of motion data associated with the user input object comprises
   obtaining, by the one or more computing devices, the first set of motion data associated with a finger of a user or a stylus operated by the user, the first set of motion data descriptive of motion of the finger or the stylus relative to a touch-sensitive screen.

3. The computer-implemented method of claim 1, wherein inputting, by the one or more computing devices, the first set of motion data into the machine-learned recurrent neural network of the motion prediction model comprises
   inputting, by the one or more computing devices, the first set of motion data into a machine-learned long short-term memory (LSTM) neural network of the motion prediction model.

4. The computer-implemented method of claim 1, further comprising:
   receiving, by the one or more computing devices as an output of the recurrent neural network, a high-dimensional context vector; and
   inputting, by the one or more computing devices, the high-dimensional context vector and a time vector descriptive of the one or more future times into a feed forward neural network of the motion prediction model;
   wherein receiving, by the one or more computing devices as the output of the motion prediction model, the motion prediction vector comprises
   receiving, by the one or more computing devices, the motion prediction vector as an output of the feed forward neural network.

5. The computer-implemented method of claim 1, further comprising:
   receiving, by the one or more computing devices as an output of the recurrent neural network, a high-dimensional context vector; and
   inputting, by the one or more computing devices, the high-dimensional context vector and a time vector descriptive of the one or more future times into a recurrent decoder neural network of the motion prediction model;
   wherein receiving, by the one or more computing devices as the output of the motion prediction model, the motion prediction vector comprises
   receiving, by the one or more computing devices, the motion prediction vector as an output of the recurrent decoder neural network.

6. The computer-implemented method of claim 1, wherein:
   inputting, by the one or more computing devices, the first set of motion data into the machine-learned recurrent neural network comprises
   inputting, by the one or more computing devices, the first set of motion data and a time vector descriptive of the one or more future times into the recurrent neural network; and
   receiving, by the one or more computing devices as the output of the motion prediction model, the motion prediction vector comprises
   receiving, by the one or more computing devices, the motion prediction vector as an output of the recurrent neural network.

7. The computer-implemented method of claim 1, wherein obtaining, by the one or more computing devices, the first set of motion data associated with the user input object comprises:
   obtaining, by the one or more computing devices, the first set of motion data that provides at least one value describing a change in the location of the user input object in an x dimension, at least one value describing a change in the location of the user input object in a y dimension, and at least one value describing a change in time; or obtaining, by the one or more computing devices, the first set of motion data that provides at least two values describing at least two locations of the user input object in the x dimension, at least two values describing at least two locations of the user input object in the y dimension, and at least two values describing at least two times.

8. The computer-implemented method of claim 1, further comprising:
training, by the one or more computing devices, the motion prediction model based on a set of training data;
wherein training, by the one or more computing devices, the motion prediction model comprises
backpropagating, by the one or more computing devices, a loss function through the motion prediction model; and
wherein the loss function comprises an error ratio that describes a first sum of one or more lengths respectively of one or more error vectors divided by a second sum of one or more lengths respectively of one or more ground truth vectors.

9. The computer-implemented method of claim 1, wherein:
obtaining, by the one or more computing devices, the first set of motion data comprises
iteratively obtaining, by the one or more computing device, a plurality of motion updates that respectively update the location of the user input object over time;
inputting, by the one or more computing devices, the first set of motion data into the recurrent neural network comprises
iteratively inputting, by the one or more computing device, each of the plurality of motion updates into the recurrent neural network as they are iteratively obtained; and
receiving, by the one or more computing devices as the output of the motion prediction model, the motion prediction vector comprises
iteratively receiving, by the one or more computing devices, a plurality of motion prediction vectors as outputs of the motion prediction model.

10. A computing device that predicts motion of user input objects, the mobile computing device comprising:
at least one processor;
a machine-learned motion prediction model that comprises a recurrent neural network, wherein the motion prediction model is trained to receive motion data indicative of motion of a user input object and, in response to receipt of the motion data, output predicted future locations of the user input object; and
at least one tangible, non-transitory computer-readable medium that stores instructions that, when executed by the at least one processor, cause the at least one processor to:
obtain a first set of motion data associated with the user input object, the first set of motion data descriptive of a location of the user input object over time;
input the first set of motion data into the recurrent neural network of the motion prediction model;
receive, as an output of the motion prediction model, a motion prediction vector that describes the one or more predicted future locations of the user input object respectively for one or more future times; and
perform one or more actions associated with the one or more predicted future locations described by the motion prediction vector;
wherein the motion prediction model was trained by backpropagation of a loss function through the motion prediction model, and the loss function comprises an error ratio that describes a first sum of one or more lengths respectively of one or more error vectors divided by a second sum of one or more lengths respectively of one or more ground truth vectors.

11. The computing device of claim 10, wherein the first set of motion data is associated with a finger of a user or a stylus operated by the user, and wherein the first set of motion data is descriptive of motion of the finger or the stylus relative to a touch-sensitive screen.

12. The computing device of claim 10, wherein the recurrent neural network comprises a long short-term memory (LSTM) neural network.

13. The computing device of claim 10, wherein:
the motion prediction model further comprises a feed forward neural network configured to receive an output of the recurrent neural network, wherein the output of the recurrent neural network comprises a high-dimensional context vector;
execution of the instructions further causes the at least one processor to input a time vector descriptive of the one or more future times into the feed forward neural network of the motion prediction model alongside the high-dimensional context vector;
the at least one processor receives the motion prediction vector as an output of the feed forward neural network.

14. The computing device of claim 10, wherein:
the motion prediction model further comprises a recurrent decoder neural network configured to receive an output of the recurrent neural network, wherein the output of the recurrent neural network comprises a high-dimensional context vector;
execution of the instructions further causes the at least one processor to input a time vector descriptive of the one or more future times into the recurrent decoder neural network of the motion prediction model alongside the high-dimensional context vector;
the at least one processor receives the motion prediction vector as an output of the recurrent decoder neural network.

15. The computing device of claim 10, wherein:
execution of the instructions further causes the at least one processor to input a time vector descriptive of the one or more future times into the recurrent neural network alongside the first set of motion data;
the at least one processor receives the motion prediction vector as an output of the recurrent neural network.

16. A computing system, comprising:
a user computing device, the user computing device comprising:
at least one processor; and
at least one non-transitory computer-readable medium that stores:
a machine-learned motion prediction model configured to receive motion data indicative of motion of a user input object and, in response to receipt of the motion data, output predicted future locations of the user input object, the motion prediction model trained by backpropagation of a loss function through the motion prediction model, the loss function comprising an error ratio that describes a first sum of one or more lengths respectively of one or more error vectors divided by a second sum of one or more lengths respectively of one or more ground truth vectors; and instructions that, when executed by the at least one processor, cause the user computing device to use the machine-learned motion prediction model to obtain the predicted future locations of the user input object.

17. The computing system of claim 16, wherein the motion prediction model comprises a recurrent neural network.

18. The computing system of claim 16, further comprising:

a training computing system that backpropagates the loss function through the motion prediction model to train the motion prediction model.

19. A computing device that predicts motion of user input objects, the computing device comprising:

at least one processor;

a machine-learned motion prediction model, wherein the motion prediction model is trained to receive motion data indicative of motion of a user input object and, in response to receipt of the motion data, output predicted future locations of the user input object, wherein the machine-learned motion prediction model comprises a recurrent neural network and a recurrent decoder neural network configured to receive an output of the recurrent neural network, wherein the output of the recurrent neural network comprises a high-dimensional context vector; and at least one tangible, non-transitory computer-readable medium that stores instructions that, when executed by the at least one processor, cause the at least one processor to:

obtain a first set of motion data associated with the user input object, the first set of motion data descriptive of a location of the user input object over time;

input the first set of motion data into the recurrent neural network of the motion prediction model;

receive, as an output of the recurrent neural network, the high-dimensional context vector;

input a time vector descriptive of the one or more future times into the recurrent decoder neural network of the motion prediction model alongside the high-dimensional context vector;

receive, as an output of the recurrent decoder neural network, a motion prediction vector that describes the one or more predicted future locations of the user input object respectively for one or more future times; and perform one or more actions associated with the one or more predicted future locations described by the motion prediction vector.

* * * * *